(12) United States Patent
van de Loo (10) Patent No.: US 6,322,221 B1
(45) Date of Patent: *Nov. 27, 2001

(54) MIRROR OPERATING MECHANISM

(75) Inventor: Paul van de Loo, Norton Summit (AU)

(73) Assignee: Britax RainsFords Pty Ltd, Lonsdale (AU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/085,708

(22) Filed: May 27, 1998

(30) Foreign Application Priority Data

May 29, 1997 (AU) .................................................. PO7068
Mar. 25, 1998 (AU) .................................................. PP2556

(51) Int. Cl.[7] ............................. G02B 5/08; G02B 7/182; B60R 1/06
(52) U.S. Cl. .................... 359/841; 359/872; 359/877; 248/479
(58) Field of Search .................. 359/841, 872, 359/877; 248/479

(56) References Cited

U.S. PATENT DOCUMENTS

| | | | | |
|---|---|---|---|---|
| 4,626,084 | * | 12/1986 | Kumai | 359/877 |
| 4,692,000 | * | 9/1987 | Wada et al. | 359/877 |
| 4,832,477 | * | 5/1989 | Torii et al. | 359/877 |
| 4,919,526 | * | 4/1990 | Umekawa et al. | 359/877 |
| 4,981,349 | * | 1/1991 | Tamiya et al. | 359/877 |
| 4,982,926 | * | 1/1991 | Mori et al. | 248/479 |
| 5,172,884 | * | 12/1992 | Ishiyama | 248/479 |
| 5,432,640 | | 7/1995 | Gilbert et al. | |
| 5,432,641 | * | 7/1995 | Mochizuki | 359/877 |
| 5,477,392 | * | 12/1995 | Mochizuki et al. | 359/877 |
| 5,523,894 | * | 6/1996 | Koiwai | 359/841 |
| 5,594,590 | * | 1/1997 | Ishiyama | 359/841 |
| 5,636,071 | * | 6/1997 | Mochizuke et al. | 359/877 |
| 5,734,517 | * | 3/1998 | Kang | 359/877 |
| 5,828,504 | * | 10/1998 | Beuzeville | 359/841 |

FOREIGN PATENT DOCUMENTS

| | | | | |
|---|---|---|---|---|
| 0 713 804 A1 | | 5/1996 | (EP) . | |
| 2237252 | * | 5/1991 | (GB) | 359/877 |
| 0151142 | * | 8/1985 | (JP) | 359/877 |
| 0134348 | * | 6/1987 | (JP) | 359/877 |
| 0237235 | * | 9/1989 | (JP) | 359/877 |
| 0290754 | * | 11/1990 | (JP) | 359/877 |
| 404345548 | * | 12/1992 | (JP) | 359/877 |
| 404345549 | * | 12/1992 | (JP) | 359/877 |

* cited by examiner

Primary Examiner—Ricky D. Shafer
(74) Attorney, Agent, or Firm—Davis & Bujold, P.L.L.C.

(57) ABSTRACT

This invention describes a mirror operating mechanism for rotating a mirror head from a deployed position to a parked position. The mirror head (12) is mounted to a mirror mounting bracket (10) via a spigot (11) on the mounting bracket. The mirror head (12) is supported on a mounting bracket (10) for rotation with respect to the spigot (11). At least one detent (17) is placed between the mirror mounting bracket (10) and the mirror head (12) to hold the mirror head (12) in the required position. Resilient means (23) acts between the mirror mounting bracket (10) and the mirror head (12) with respect to the detent (17) so that the detents (17) are held in engaged positions. Drive means is operatively coupled to the spigot (11) to cause the mirror head (12) to rotate with respect to the spigot (11). The drive means includes an actuator (56, 50 or 92) that is moved upon initial operation of the drive means while the detents (17) resist rotation of the mirror head (12). The actuator (56, 50 or 92) movement applies a force to the resilient means (23) to in turn compress it and to allow movement of the mirror head (12) so that the detents (17) may disengage to thereby allow rotation of the mirror head (12) by the drive means. The advantage of the invention is that the drive means does not require excessive force to disengage the detents (17). This results from the operating mechanism first disengaging the detent (17) before requiring the drive means to rotate the mirror head (12).

40 Claims, 10 Drawing Sheets

MIRROR OPERATING MECHANISM

This invention relates to a mirror operating mechanism, and in particular to a mechanism which is able to move a mirror from an in-use driving or deployed position to a second position such as an intermediate or park position.

BACKGROUND OF THE INVENTION

The invention will be described in relation to its application to a wing or side mirror used on motor vehicles. However, it should be realised that the operating mechanism may be for use with other devices not necessarily mirrors, and therefore the invention should not be restricted to this specific application described hereunder.

Mirror heads are designed to rotate about a vertical pivot both forwards or backwards. The mirror head is held in its driving position by a detent which allows manual movement of the mirror housing to a parked position, deflection through being hit by passing traffic or colliding with an obstruction. With the mirror parked, the mirror head is substantially parallel to the side of the vehicle which in turn reduces the risk of impact or interference from passing pedestrians or other vehicles. It is particularly useful when the vehicle is parked in or travelling along narrow or congested roadways.

Typically, known automatic parking mechanisms are designed to drive the mirror head out of its normal operative position by applying sufficient torque to overcome the holding power of the mirror head detents. In addition, extra detents are required that have a greater breaking torque than the first set to enable manual breakaway of the mirror and associated drive means if the mirror head is impacted. Clearly, the drive mechanism will be required to provide sufficient torque to overcome the first set of detent mechanisms. This may be quite significant torque depending on how rigidly the mirror is to be held in either its operative or parked positions. This requires high power motors that have a high noise output. The mirror head, bracket and spigot also need to be designed to resist high loads and this normally means the use of metal components.

It is an object of this invention to provide a mechanism, and a particular mirror operating mechanism that allows automatic parking of the mirror head that overcomes the above problems. Preferably, the invention can be used to automatically park the mirror head when the vehicle ignition is switched off, and to then "retrieve" the mirror head to its deployed position once the ignition is again switched on.

It is also an aim of this invention to provide a drive means which will enable both linear movement and rotational movement of a mirror head or any other element that requires this combination of movement, be it a mirror head or otherwise.

SUMMARY OF THE INVENTION

In its broadest form, the invention is a mirror operating mechanism for rotating a mirror head with respect to a mounting bracket comprising:
  a mirror mounting bracket,
  a spigot on said mounting bracket,
  a mirror head supported on said mounting bracket for rotation with respect to said spigot,
  at least one detent between said mirror mounting bracket and said mirror head to hold said mirror mounting bracket and mirror head in position,
  resilient means acting between said mirror mounting bracket and mirror head, with respect to said detent, that holds said detent engaged, thereby restraining movement of said mirror head,
  drive means operatively coupling said spigot to said mirror head to rotate said mirror head with respect to said spigot, and
  an actuator incorporated within said drive means that is moved by said drive means upon its initial operation while said detent engaged and therefore resisting rotation of said mirror head, said actuator movement applying a force to said resilient means to in turn compress said resilient means to allow movement of said mirror head with respect to said mirror mounting bracket so that said detent may disengage whereupon said actuator ceases movement and said drive means in turn rotates said mirror head with respect to said spigot once said detent is disengaged.

Although the invention in its broadest form is described in relation to a mirror head attached to a mounting bracket, it will be understood that it will be equally suited to other elements where one element is to move with respect to the other.

The movement of the mirror head may be in a direction that is either parallel to the longitudinal axis of the spigot, or transversed to the longitudinal axis of the spigot. The detent will be positioned accordingly. Movement parallel to the spigot would use a vertical detent, and transverse movement would use a horizontal detent.

Preferably, detents used with the mirror operating mechanisms may comprise a recess having a pair of inclined surfaces that mate with a corresponding projection, also with inclined surfaces at each end of the projection. Alternatively, spring loaded detent balls may be used in combination with recesses.

The drive means preferably comprises an electric motor in combination with associated drive gears. The actuator which is operated by the drive means upon its initial operation, causes movement of the mirror head to allow the detents to disengage. Continued operation of the drive means then causes rotation of the mirror head into a parked position. Once the detents have disengaged, the resistance to further linear motion of the mirror head will be greater than the resistance for rotation of the mirror head which then results in rotation of the mirror head.

In respect of vertical movement of the mirror head, the resilient means may comprise a coil spring that is coaxial with the spigot and forces the mirror head against the detents. In this case, vertical movement of the mirror head will require compression of the coil spring to lift the mirror head to allow the detent to disengage. The drive means may include a gear wheel journalled with respect to the spigot so that the axis of the gear wheel is coaxial with the spigot and so that the gear wheel is able to move longitudinally with respect to the spigot axis. Preferably, the coil spring acts directly against the upper surface of the gear wheel and the gear wheel in turn abuts against a portion of the mirror head to therefore transfer force to the detent.

The actuator preferably comprises at least a first ramp surface on the gear wheel that engages a corresponding second ramp surface that is held with respect to the spigot. Upon initial operation of the drive means, the ramp surfaces engage and cause a linear movement of the gear wheel with respect to the longitudinal axis of the spigot as the first ramped surface slides up the second ramped surface. The coil spring resists the lifting of the gear wheel, however continued movement of the first ramp surface with respect to the second ramp surface causes compression of the coil spring and in turn lifts the gear wheel away from its engagement with the mirror head. This in turn relieves the amount of force applied to the detents and upward movement of the mirror head to eventually allow disengagement of the detent.

There may be some clearance between the first and second ramped surface so some minor rotation of the gear wheel is required before the ramped surfaces engage. The clearance will ensure that the gear wheel can always apply load to the mirror head when it is not being driven. This in turn applies load to the detent between the mirror head and mirror mounting bracket.

When the gear wheel is sufficiently lifted and the detent disengaged, the gear wheel will remain stationary and the electric motor will drive itself and the attached mirror head around the static gear thereby causing rotation of the mirror head with respect to the mirror mounting bracket.

The ramped surfaces may comprise a variety of shapes, but preferably either a projection having ramped ends, or a saw tooth shape projection may be used. Preferably, three sets of ramped surfaces are equally spaced around the spigot to balance forces on the gear wheel and provide a stable mounting.

A clutch may also be incorporated within the assembly. The clutch may be located between the gear wheel and the mirror mounting bracket and comprise a clutch plate and clutch detent. This arrangement allows breakaway of the mirror head as a result of manual force being applied to the mirror head, or through the mirror head being restrained against rotation.

In addition, the clutch plate may be positioned so that, even though the clutch detent is disengaged through either manual operation or movement of the mirror head being restrained, the spring still applies a constant down load force to the detent. This enables positive re-engagement of the detent through manual movement of the mirror head even though the clutch plate remains disengaged.

Further, a helper plate may be located against one surface of the static gear on a side which is opposite to that containing the first and second ramped surfaces. Third and fourth ramped surfaces may be provided on both the helper plate and the static gear which, through force applied by the spring, reduce the lifting force upon initial rotation of the static gear. This in turn requires less power from the electric motor, or allows the use of steeper ramps on the static gear to provide faster detent disengagement for a given motor speed and torque.

The spigot may be tubular which allows the location of the spring means, preferably a coil spring, within the spigot. In addition other components may also be located within the spigot which allows for greater flexibility in the design of the mirror. It also means that the stiffness of the spigot can be greatly increased as its diameter increases so that lower strength materials can be used. This results in a lower cost component that may also be easier to manufacture.

In order to achieve transverse movement of the mirror head with respect to the spigot to disengage the detents, the actuator may comprise a shaft that is slidably journalled with respect to the mirror head, and a worm drive on the shaft that engages a gear wheel which is held with respect to the spigot. Upon initial operation of the drive means, the worm, acting against the fixed gear wheel, moves the shaft along its longitudinal axis so that the movement of the shaft acts against the mirror head to move it transversely with respect to the spigot to in turn compress the resilient means so that the mirror head may move transversely to allow the detents to disengage.

Preferably, a housing is mounted with respect to the spigot, and the shaft is slidably journalled with respect to this housing. The mirror head is mounted with respect to the housing so that the housing prevents rotation of the mirror head with respect to the spigot, but the mounting of the housing is such that the mirror head may move laterally with respect to the spigot. Preferably, the resilient means comprises a coil spring which is positioned between the housing and the mirror head which in turn pushes the mirror head so that the detents forcefully engage.

Lateral movement of the shaft upon initial operation of the drive means pushes an end of the shaft against the mirror head and forces it away from the detents. This in turn compresses the spring so that the mirror head may move transversely to allow the detents to disengage.

When the detents have been disengaged, the force required to cause further compression of the coil spring will be greater than the force required to rotate the mirror head. Continued operation of the drive means, and therefore continued rotation of the shaft, will then result in the worm preferentially driving around the gear wheel. This will in turn cause rotation of the mirror head.

The shaft and worm gear is arranged for only limited amount of lateral movement, this lateral movement being sufficient to allow full disengagement of the detent to enable mirror head rotation. Preferably, once the mirror head reaches its fully rotated position, the mirror head will abut against a stop, and the resultant increase in motor current will electronically de-energise the motor.

A clutch means may be provided between the gear wheel and the spigot which enables movement of the gear wheel and mirror head with respect to the spigot when force is applied to the mirror head. For example, if the mirror head is impacted in either direction, then the clutch will allow disengagement of the static gear thereby allowing the mirror head and associated drive means to rotate with respect to the spigot. Also, if movement of the mirror is impeded while being driven to or from a parked position, the motor will be prevented from stalling by release of the clutch.

Preferably, the clutch comprises a spring bearing against the static gear and a clutch detent beneath the gear wheel that provides sufficient holding force for normal operation of the operating mechanism, but which releases when sufficient force is applied to the mirror head.

During disengagement of the detents in respect of both vertical and transverse movement of the mirror head, there will be a slight amount of rotation of the mirror head as the force applied to the detent is relieved. This will be due to the gradual outward movement of the mirror head and the corresponding readjustment of the detent position.

DESCRIPTION OF THE DRAWINGS

Embodiments of the invention will now be described, but it should be realised that the scope of the invention is not to be limited to these specific details of the these embodiments. Five embodiments are illustrated in the accompanying drawings.

DETAILED DESCRIPTION OF PREFERRED EMBODIMENTS

A first embodiment is illustrated in FIGS. 1 to 5. A mirror mounting bracket 10 is secured to the side of a motor vehicle. Attached to the mirror mounting bracket 10 is a spigot 11. The spigot 11 has a vertical axis, and the mirror head 12 is mounted so that it rotates about the vertical axis of the spigot 11. The main result to be achieved by the invention is to rotate the mirror head 12 from a deployed position to a parked position where the mirror head 12 is substantially parallel to the side of the vehicle with the mirror glass of the mirror head 12 against the vehicle body. Preferably, this occurs through either operation of a manual control, or as the ignition is turned off. The invention also redeploys the mirror upon either operation of a manual control or the ignition being turned on.

Figure 1:
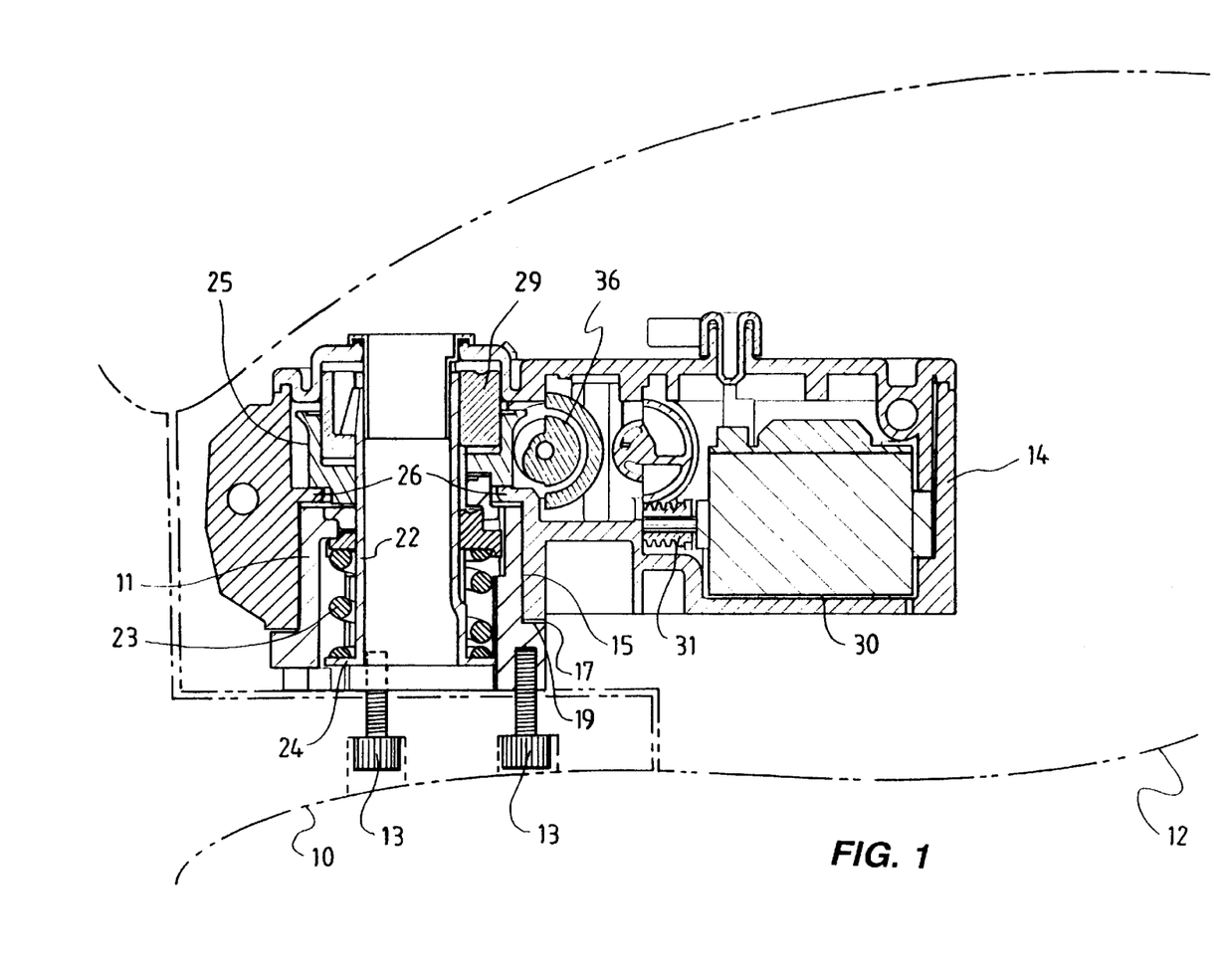
FIG. 1 shows a cross-sectional view of a mirror operating mechanism about cross-section line 1—1 of FIG. 3 and shows the dotted outline of a mirror bracket and mirror head.
Figure 2:
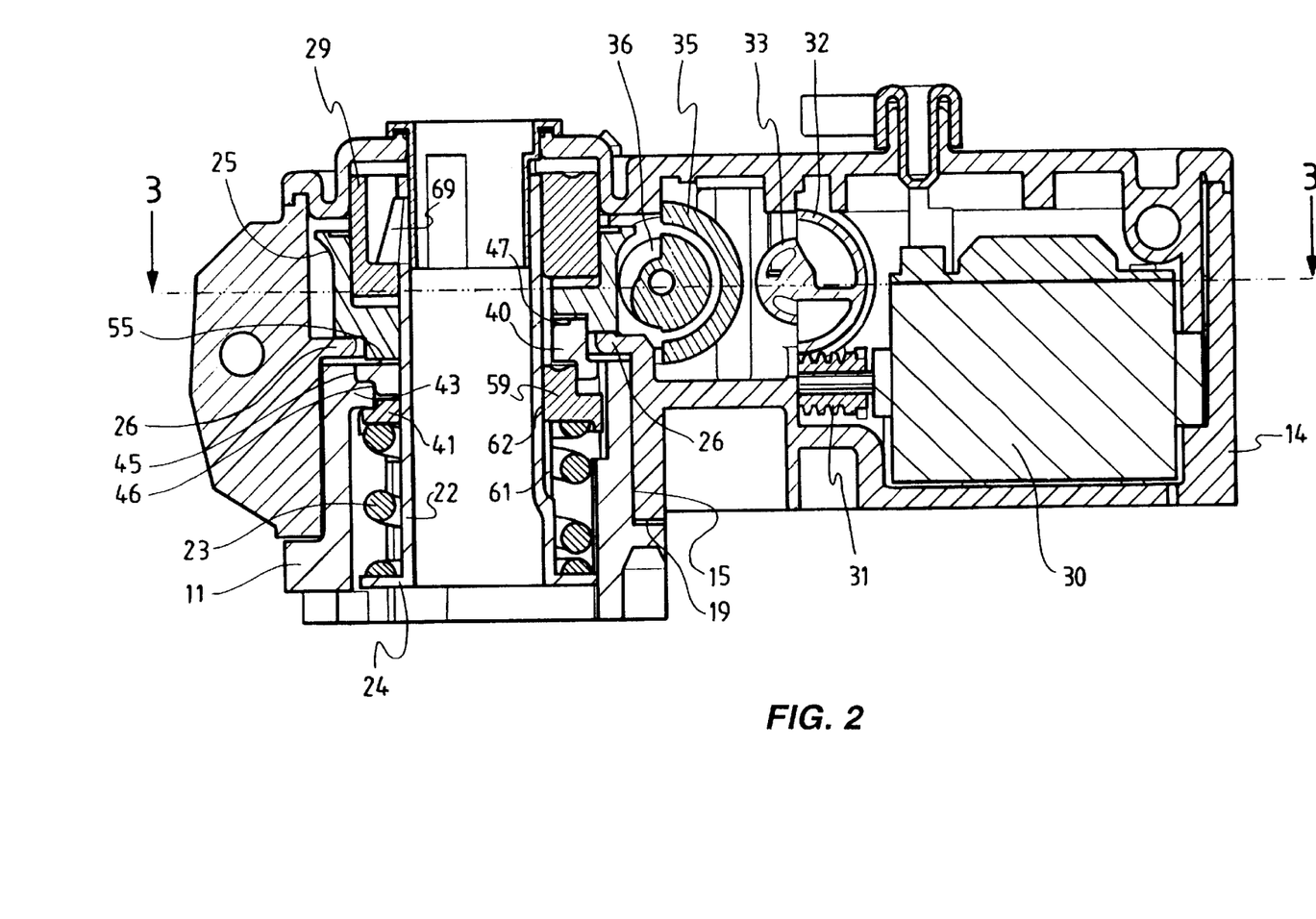
FIG. 2 shows the same cross-sectional view of a mirror operating mechanism illustrated in FIG. 1, but at a larger scale.

In this embodiment, the spigot 11 is tubular, and is held to the mirror mounting bracket 10 via threaded fasteners 13.

Part of the mirror operating mechanism shown in this embodiment is contained within a casing 14 which in turn is secured to the mirror head 12. The casing 14 has a cylindrical bearing surface 15 which is journalled to the external surface of the spigot 11. This enables the casing 14 and attached mirror head 12 to rotate with respect to the spigot 11.

Detents 17 are provided between the casing 14 and the spigot 11. In this embodiment, the detents 17 comprise three projections 18 on the base of the spigot 11, and corresponding recesses 19 in the base of the casing 14. The projections 18 and the recesses 19 have angled surfaces 20 and 21 which assist in disengagement of the detent as the casing 14 rotates with respect to the spigot 11. The projection 18 does not fully engage within the recess 19. This ensures that the lower surface of the casing 14 does not abut against the base of the spigot 11. This results in positive engagement of the detents, which in turn resists any relative rotation of the casing 14 with respect to the spigot 11.

The tubular spigot 11 enables some of the components to be located within the spigot 11. In this embodiment, a tube 22 is located within the spigot 11 so that the axis of the tube 22 is coaxial with the axis of the spigot 11. In this embodiment, the resilient means comprises a coil spring 23 that is located on the outer surface of the tube 22. The tube 22 has a flange 24 at its lower end against which the lower end of the spring 23 abuts.

The tube 22 extends beyond the upper end of the spigot 11. A gear wheel 25 is journalled to the tube 22. The gear wheel 25 sits above the upper end of the spigot 11, and has a flange 26 positioned between it and the spigot 11. The flange 26 is part of the casing 14. The gear wheel 25 abuts against the upper edge of the flange 26. A retainer 29 is held at the end of the tube 22. The retainer 29 is also prevented from rotating with respect to the tube 22.

The spring 23 pushes the tube 22 downwardly so that the retainer 29 applies a force to the upper surface of the gear wheel 25. This in turn forces the gear wheel 25 on to the flange 26 which in turn forces the casing 14 downwardly with respect to the spigot 11. In this way, the spring 23 transfers its force to the detents at the base of the spigot 11.

Figure 3:
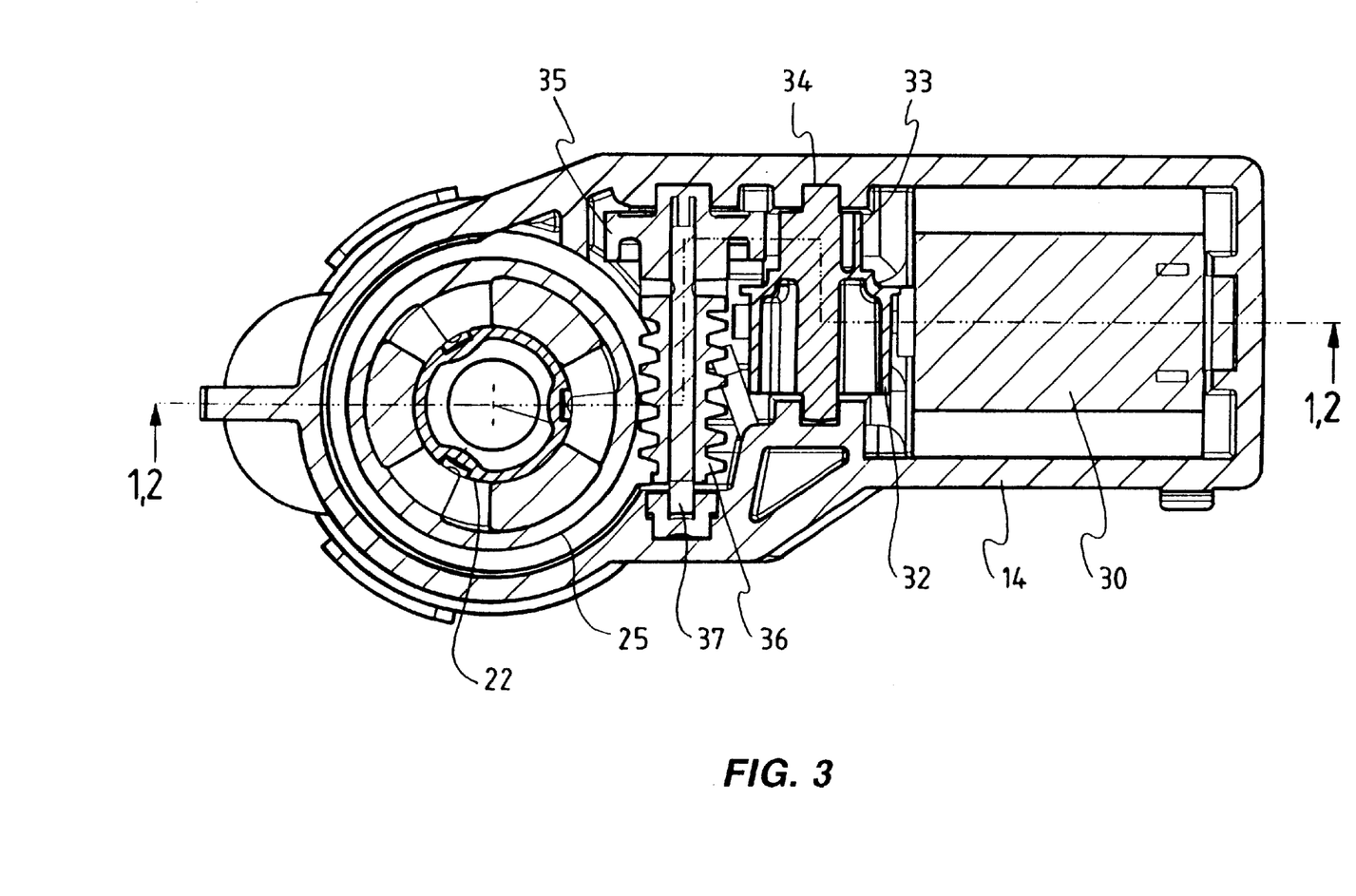
FIG. 3 shows a cross-sectional view of a mirror operating mechanism along cross-section line 3—3 of FIG. 2.

Referring to FIGS. 2 and 3, the casing 14 houses an electric motor 30 which in turn drives a drive gear assembly. The drive gear assembly comprises a worm drive 31 that is attached directly to the electric motor 30. The worm drive 31 in turn drives a reduction gear assembly which comprises a first gear 32 and a smaller second gear 33. The first and second gears 32 and 33 have a common axle 34 that is journalled within the casing 14. A further reduction gear assembly is provided which comprises a third gear 35 combined with a worm drive 36. The third gear and worm drive 35 and 36 have a common axis 37 and are journalled within the casing 14. The second gear 33 meshes with the third gear 35, and causes rotation of the worm drive 36. The worm drive 36 engages the gear wheel 25.

When the detents 17 are engaged, operation of the motor 30 and associated gear drive will cause the worm drive 36 to attempt to rotate gear wheel 25. When the detents 17 are disengaged continued operation of the electrical motor 30 will result in the gear wheel 25 remaining stationary which will then result in the worm drive 36, and consequently the casing 14 and attached mirror head 12, rotating around the gear wheel 25 and spigot 11. Further details of this operation will be described below.

Figure 4:
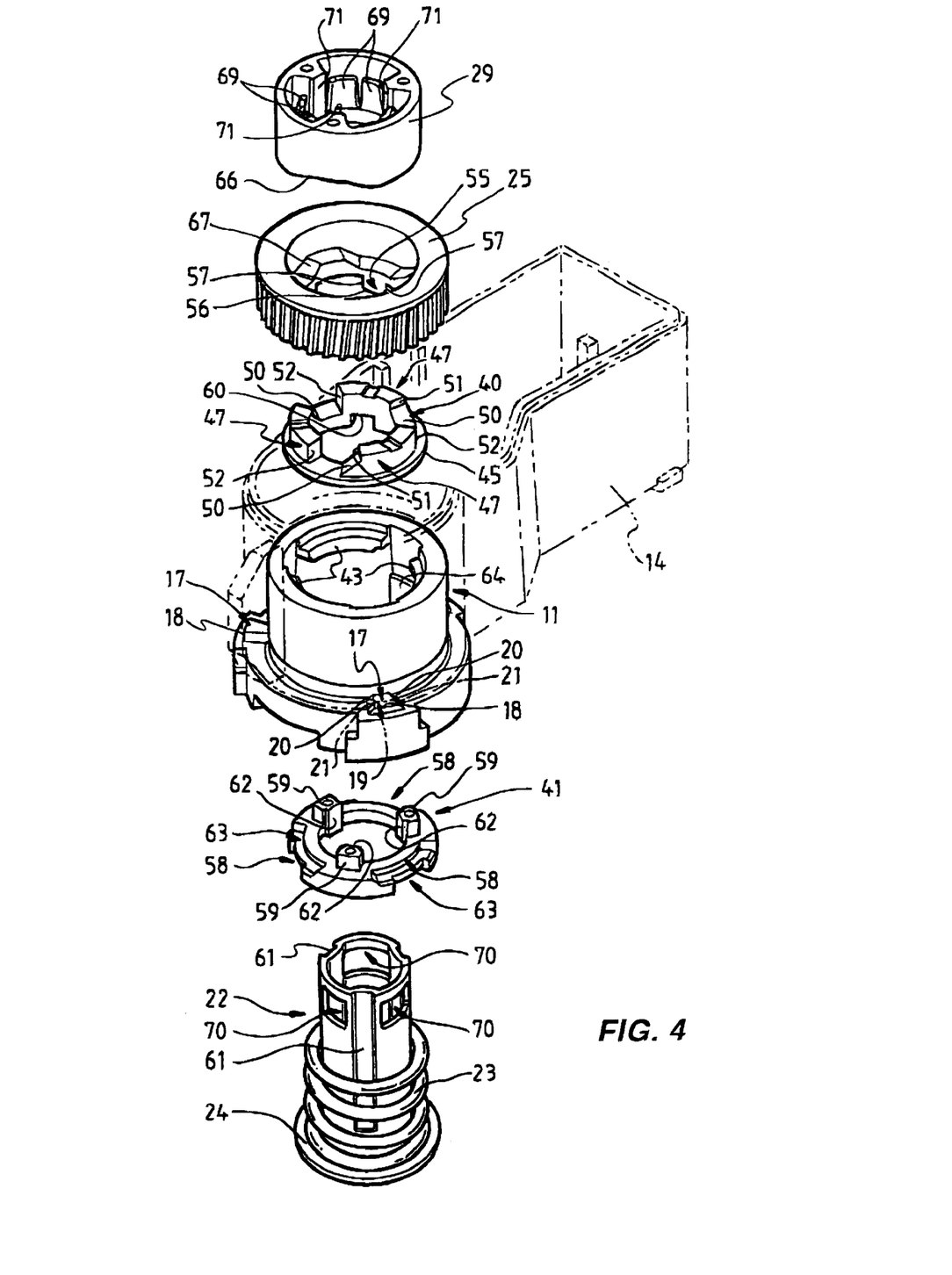
FIG. 4 shows an exploded view of components assembled around the spigot of the mirror bracket.
Figure 5:
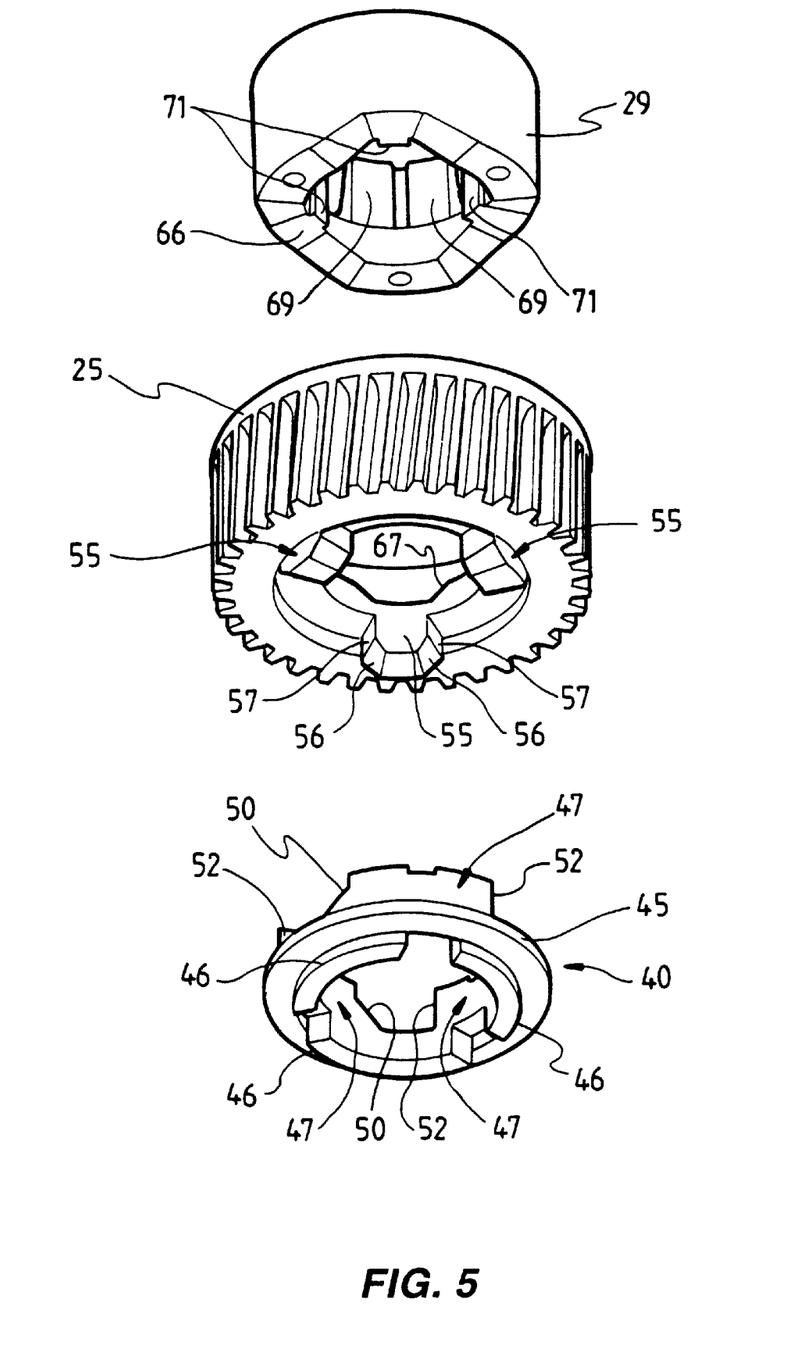
FIG. 5 shows an exploded view of a retainer gear wheel and lifting plate.

FIGS. 4 and 5 best show a lifting plate 40 and a clutch plate 41. The lifting and clutch plates 40 and 41 are located in the end of the tubular spigot 11. The lifting plate 40 in combination with the gear wheel 25 comprise the actuator that provides the upward movement of the gear wheel 25 upon initial operation of the electric motor. The clutch plate 41 enables breakaway of the mirror head should some form of external force be applied to the mirror head either with or without the electric motor 30 operating. The upper end of the spigot tube 11 has a ledge 43 about which the lifting and clutch plates 40 and 41 are journalled for rotation.

The lifting plate 40 has a ring portion 45 that locates within a circular recess in the upper end of the spigot 11 so that the ring 45 sits on ledges 43. The underneath surface of ring 45 has three circular ridges 46 that abut against the inner periphery of ledges 43.

The upper surface of the ring 45 is provided with three projections 47. Each projection comprises a second ramp surface 50, a first vertical surface 51 and second vertical surface 52.

The gear wheel 25 has three projections 55 that locate within the space between the projections 47 on the lifting plate 40. The projections 55 have first ramped surfaces 56 which abut against the second ramped surfaces 50 and vertical surfaces 57. There is some clearance between the projections 55 and the ring 45 to ensure that the gear wheel 25 always rests against the flange 26 of the casing 14.

The lifting plate 40 is normally held with respect to the spigot 11. Upon initial operation of the electric motor 30, the worm drive 36 causes the gear wheel 25 to rotate slightly with respect to the lifting plate 40. Continued rotation of the gear wheel 25 causes sliding engagement of the first and second ramped surfaces 55 and 50, which causes a vertical lifting motion of the gear wheel 25. This is resisted by the spring 23, but this resistance is less than the engaging force provided by the detents 17. This results in continued lifting of the gear wheel 25 until it is sufficiently raised above the flange 26 to enable vertical movement of the mirror head and disengagement of the detents 17. Once the detents 17 are disengaged, the force required to lift the gear wheel 25 against the spring 23 is greater than the force required to rotate the mirror head 12 so that continued operation of the worm drive 36 will cause it to drive itself around the periphery of the stationary gear wheel 25. The consequence of this is that the casing 14 and attached mirror head 12 will rotate about the spigot.

The embodiment shown in FIGS. 1 to 5 is for an operating mechanism used with a right-hand mirror. The gear wheel 25 shown in this embodiment has a pair of first ramp surfaces 56 either side of projections 55 so that it may be used for either left-hand or right-handed mirrors. Obviously, a left-hand lifting plate 40 would be required with the second ramp surfaces 50 on the opposite side of the projections 47 as shown in this embodiment.

The clutch plate 41 is held between the spring 23 and the underneath surface of ledges 43. Each of the ledges 43 locate within recesses 58 in the clutch plate 41. The underneath surfaces of the ledges 43 and the recesses 58 comprise the clutch detent.

The lifting and clutch plates 40 and 41 are restrained from rotating relative to one another, the lifting plate 41 journalled for rotation about tube 22 and the clutch plate 41 is able to slide longitudinally along the tube 22.

The tube 22 is provided with three longitudinal channels 61 that are radially spaced around the surface of the tube 22. Each of the channels 61 extends right to the upper end of the tube 22. To restrain relative rotation of the clutch plate 41 with respect to the tube 22, it has three lugs 62 that engage respective channels 61. The tube 22 is slid into position through the centre of the clutch plate 41. The engagement of the lugs 62 in the channels 61 does enable the clutch plate 41 to slide axially along the tube 22.

The clutch plate 41 has three posts 59 which locate within recesses 60 of the lifting plate 40. Engagement of the posts 59 within the recesses 60 prevent the clutch plate 41 rotating with respect to the lifting plate 40, but does enable a degree of axial separation of the clutch plate 41 with respect to the lifting plate 40 while maintaining engagement between the posts 59 with the recesses 60.

The clutch plate 41 has three radial recesses 63 in its peripheral portion. The internal surface of the spigot 11 has three longitudinal ribs 64 that are engaged by the radial recesses 63. This enables the clutch plate 41 to be inserted into the spigot 11 from its base. The longitudinal ribs 64 do not extend for the full height of the spigot 11, and when the radial recesses 63 disengage from the end of the ribs 64, the clutch plate 41 can be rotated so that the recesses 58 engage the ledges 43. The pitch circle diameter of the outer surface of the post 59 locates within the inner diameter of the projections 43. This enables the clutch plate 41 and posts 59 to fully rotate with respect to the spigot 11 when the clutch plate 41 moves downwardly so that the ledges 43 disengage from the recesses 58.

In this embodiment, the retainer 29 also comprises a helper plate where the retainer 29 three third ramped surfaces 66 that engage with fourth ramped surfaces 67 on the gear wheel 25. The direction of inclination of the third and fourth ramped surfaces 66 and 67 is the same as the first and second ramped surfaces 56 and 50 however the degree of inclination of the third and fourth ramped surfaces 66 and 67 with respect to the horizontal is less than the degree of inclination of the first and second ramped surfaces 56 and 50. This ensures that some assistance is provided to raise the gear wheel 25 by relative movement between the third and fourth ramped surfaces 66 and 67 due to the downward pressure exerted by the spring 23, while at the same time providing sufficient downward force to allow the gear wheel 25 to lower with respect to the first and second ramped surfaces 56 and 50 when required. Obviously, if the angle of the third and fourth ramped surfaces 66 and 67 were the same as the first and second ramped surfaces 56 and 50, then there would be no net downward force applied to the gear wheel 25. By reducing the angle of the third and fourth ramped surfaces 66 and 67 with respect to the horizontal, then there will be a net downward acting force. This net downward force must be sufficient to overcome the frictional load between the various ramped surfaces.

The retainer 29 has a plurality of barbs 69 which engage within apertures 70 of the tube 22. The retainer 29 is pushed onto the end of the tube with lugs 71 engaging the channels 61. This prevents rotation of the retainer 29 with respect to the tube 22. The retainer 29 is pushed into place until the barbs 69 spring into the apertures 70. Due to the compression of the spring 23 an upward force is applied to the retainer 29 and the location of the barbs 69 within the aperture 70 holds the retainer 29 in position on the tube 22.

Upon the electric motor 30 being energised, the worm drive 36 will apply force to drive the gear wheel 25 in a clockwise direction. Movement of the worm drive 36 and casing 14 around the gear wheel 25 will be prevented by engagement of the detents 17. The force required to disengage the detents 17 at this stage will be in excess of the force required for the worm drive 36 to rotate the gear wheel 25 against the first and second ramped surfaces 56 and 50. As the worm drive 36 continues to drive the gear wheel 25, it will result in the first ramped surfaces 56 sliding along the second ramped surfaces 50. This will in turn cause lifting of the gear wheel 25. It will be lifting against the force of the spring 23.

Continued operation of the worm drive 36 will result in the gear wheel 25 lifting clear of the flange 26. This will result in the angled surfaces 20 of the detents 17 sliding with respect to one another which, together with the third and fourth ramped surfaces 66 and 67, provides some additional force that assists to compress the spring 23.

Obviously, a shallow angle of the first and second ramped surfaces 56 and 50, will require less force to rotate the gear wheel 25 against the spring 23. However, the disadvantage of a low angle is that lifting of the gear wheel 25 will occur quite slowly. Accordingly, a steeper angle for the first and second ramped surfaces 56 and 50 which provides a rapid lift of the gear wheel 25 is compensated through the force provided by the third and fourth ramped surfaces 66 and 67 and the angled surfaces 20 and 21 on the detents 17. This minimises the lifting load of the gear wheel 25 while at the same time ensuring that a rapid lift is achieved. This in turn means that less motor power is required, and a quiet and quick operation is achieved.

As the gear wheel 25 continues to lift, the detents 17 will reach a point where they can readily disengage. At this point, the force required to rotate the casing 14 and mirror head 12 with respect to the spigot 11 is less than required to lift the gear wheel 25. When this occurs, the gear wheel 25 will remain stationary, and the worm drive 36 will drive itself together with the casing 14 and mirror head 12 around the gear wheel 25. This obviously rotates the mirror head into a parked position. Operation of the motor 30 and therefore rotation of the mirror head 12 will continue until the mirror head reaches its parked position. At this point, further rotation of the mirror head 12 will be restrained, which will result in an increase in the current drawn by the motor. This current increase can be sensed and electronic controls provided to de-energise the motor 30.

When the electric motor 30 is energised again to move the mirror head 12 from a parked position to its deployed position, the motor 30 will again operate to rotate the gear wheel 25. Obviously, the direction of rotation of the electric motor 30 will be opposite to that used to park the mirror head 12. The initial rotation of the gear wheel 25 will cause the vertical surfaces 57 on projections 55 of the gear wheel 25 to engage the second vertical surfaces 52 on the lifting plate 40. This will prevent further rotation of the gear wheel 25 which in turn will cause the worm drive 36 to move around the periphery of the gear wheel 25. This in turn causes rotation of the casing 14 and mirror head 12 to the deployed position. At the deployed position, the detent 17 will again re-engage, and the current drawn by the motor will increased, be sensed and result in the motor 30 being de-energised.

Should the mirror head 12 be forced either while the electric motor 30 is not operating or even when it is operating, the clutch plate 41 will disengage and allow free rotation of the mirror head 12. For example, if the mirror head 12 is pushed in either direction, then the vertical surfaces 57 on the gear wheel 25 will engage either the first or second vertical surfaces 51 or 52 depending on the direction that the mirror head 12 is rotated. This will then transfer the rotation force from the lifting plate 40 via the posts 59 to the clutch plate 41. Provided that this force is sufficient, then the clutch plate 41 will move downwardly with respect to the tube 22 and allow the ledges 43 to disengage from the recesses 58. This will then enable the combination of the clutch plate, the tube 22 which is rotationally secured to the clutch plate 41, the lifting plate 40 which is rotationally secured to the clutch plate 41, the gear wheel 25 which is restrained by engagement of the vertical surfaces 57 with either the first or second vertical surfaces 51 or 52 and the casing 14 to rotate freely with respect to the spigot 11. This will result in detents 17 disengaging.

In this manner, the mirror head 12 can be manually placed into the parked position. Through this means, the clutch plate 41 will be disengaged from the ledges 43. Upon further operation of the electric motor 30, the gear wheel 25 will rotate until the clutch plate re-engages with the ledges 43. This will then enable normal operation of the assembly.

If during operation of the motor 30, the mirror head 12 were to become jammed, such as coming up against an obstruction, then the worm drive 36 will stop rotating with respect to the spigot 11, and will in turn rotate the gear wheel 25 until the vertical surfaces 57 come into contact with either the first or second vertical surface 51 or 52. The lifting plate 40 will then be driven by the gear wheel 25, and will turn, via the posts 59 drive the clutch plate so that the ledges 43 disengage from the recesses 58. Alternatively, the load required to disengage the ledges 43 from the recesses 58 may be such as to draw excessive current and cause the current sensing circuitry to de-energise the motor 30.

Figure 6:
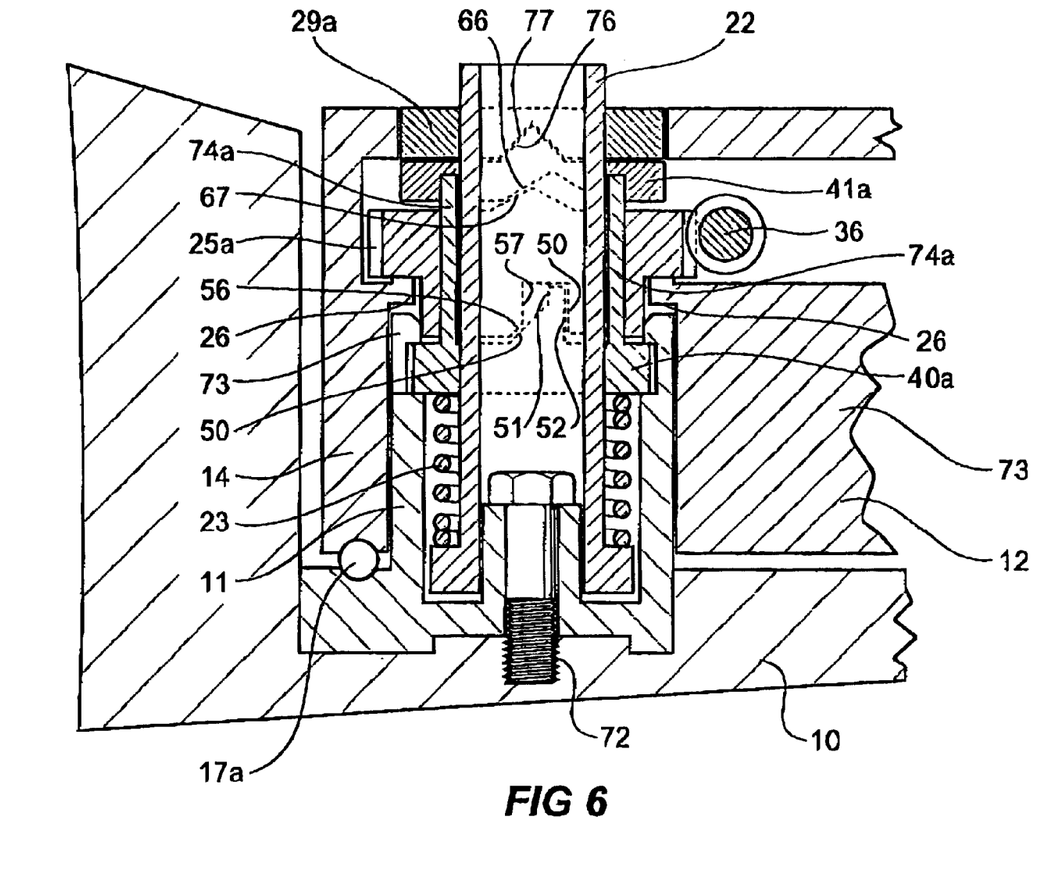
FIG. 6 shows a cross-sectional view of a second embodiment of the invention.

FIG. 6 shows a second embodiment of the invention and differs from the first embodiment in that the clutch plate 41a is positioned above the gear wheel 25a. In this embodiment, the spigot 11 is secured to the mirror mounting bracket 10 via a threaded fastener 72. A single threaded fastener 72 is all that is required. The tube 22 and spring 23 are located within the tubular spigot 11. The lifting plate 40a is held beneath flanged fingers 73 at the end of spigot 11. This prevents longitudinal movement of the lifting plate 40a with respect to the spigot 11, but enables it to rotate. The spring 23 bears against the lower surface of the lifting plate 40a. The gear wheel 25a is located above the lifting plate 40a, and the lifting plate 40a has a tubular extension 74a to which the gear wheel 25a is journalled.

The clutch plate 41a is located above the gear wheel 25a, and the engaging surfaces of the clutch plate 41a and gear wheel 25a perform the function of a helper plate. They are provided with third and fourth ramped surfaces 66 and 67 that assist in the upward movement of the gear wheel 25a. The tubular extension 74a has a castellated end which engages corresponding recesses within the clutch plate so that the clutch plate 41a is unable to rotate independently of the lifting plate 40a, but is able to move longitudinally with respect to the lifting plate 40a along the axis of the spigot 11.

The upper surface of the clutch plate 41a abuts against the lower surface of a retainer 29a. The upper surface of the clutch plate 41a is provided with a number of V-shaped projections 76 which locate within V-shaped recesses 77 within the retainer 29a. The retainer 29a is held on the end of the tube 22 so that it is not able to rotate or move longitudinally with respect to the tube 22.

Operation of the motor 30 will cause the gear wheel 25a to lift thereby relieving the downward load applied to the detent 17a. This will enable rotation of the mirror head 12 upon continued operation of the motor 30. The third and fourth ramped surfaces 66 and 67 will assist in the upward movement of the gear wheel 25a. Breakaway movement or jamming of the mirror head 12 will result in disengagement of the V-shaped recesses and projections 66, 67. In addition, if the mirror head 12 is moved from a parked position to its operating position manually, which results in disengagement of the V-shaped recess and projection 76 and 77, there will still be a force applied to the upper surface of the gear wheel 25a which in turn results in a load being applied to the detents 17a. This will enable positive relocation of the detent 17a upon manual outward movement of the mirror head 12.

Figure 7:
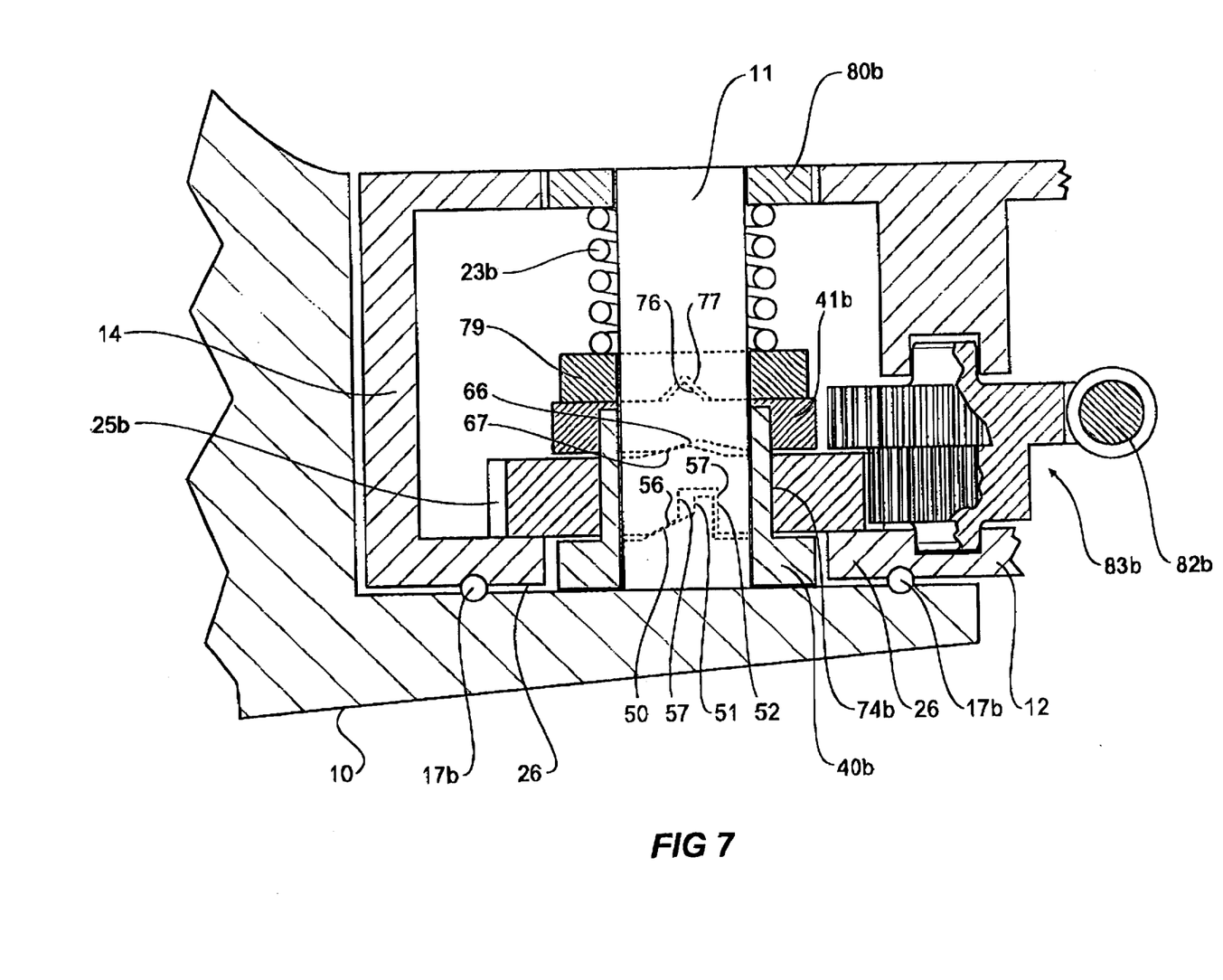
FIG. 7 shows a cross-sectional view of a third embodiment of the invention.

A third embodiment is shown in FIG. 7. In this embodiment, the main variation is that all of the elements are journalled to the external surface of the spigot 11. The lifting plate 40b is journalled on the external surface of the spigot 11, and has a tubular extension 74b. The gear wheel 25b is journalled to the external surface of the tubular extension 74b. The gear wheel 25b abuts against flanges 26. The clutch plate 41b is located above the gear wheel 25b. A clutch detent disc 79 is located above the clutch plate 41b. The spring 23b is located between the clutch detent disc 79 and a spring disc 80b. The spring disc 80b is secured to the spigot 11 so that the spring 23b applies a compressive load to the upper surface of the clutch detent disc 79 and in turn transfers force via the abutment of the gear wheel 25b on flanges 26 to the detents 17b.

This embodiment uses a minor modification in the gear drive in that a worm drive 82b is used to drive a reduction gear set 83b which in turn drives the gear wheel 25b.

As in the second embodiment, the tubular extension 74b has a castellated end which engages corresponding recesses within the clutch plate 41b. This prevents relative rotation between the lifting and clutch plates 40b and 41b but enables the clutch plate 41b to move with respect to the longitudinal axis of the spigot 11.

As with the second embodiment, the abutting surfaces between the clutch plate 41b and the gear wheel 25b are provided with third and fourth ramped surfaces 66 and 67, and the abutting surfaces between the upper surface of the clutch plate 41*b* and the clutch detent disc 79 are provided with V-shaped projection and recesses 76 and 77.

The actuator for lifting the gear wheel 25*b* is the same for both the second and third embodiment. The actuator comprises a first and second ramped surfaces 56 and 50 which are caused to slide with respect to one another upon initial operation of the electric motor 30. This results in an upward movement of the gear wheel 25*b*, a relieving of down load force on the detent 17*b*, and the resultant lifting of the casing 14 and mirror head 12. Once lifted sufficiently, the detent 17*b* will disengage, and the mirror head 12 will rotate in a manner similar to that described in respect of the first embodiment.

The operation of the first and second vertical surfaces 51 and 52 and the vertical surfaces 57 are the same as that described in the first embodiment.

As with the second embodiment, even if the V-shaped projection and recess 76 and 77 are disengaged, there will be a constant down load applied via the gear wheel 25*b* to the flange 26 which will enable positive relocation of the detent 17*b* should the mirror head 12 be manually returned to its operating position. This is also the case in respect of the first embodiment. This is an important safety feature, as it ensures that the detents 17 will re-engage if the mirror is manually moved to its deployed position.

Figure 8:
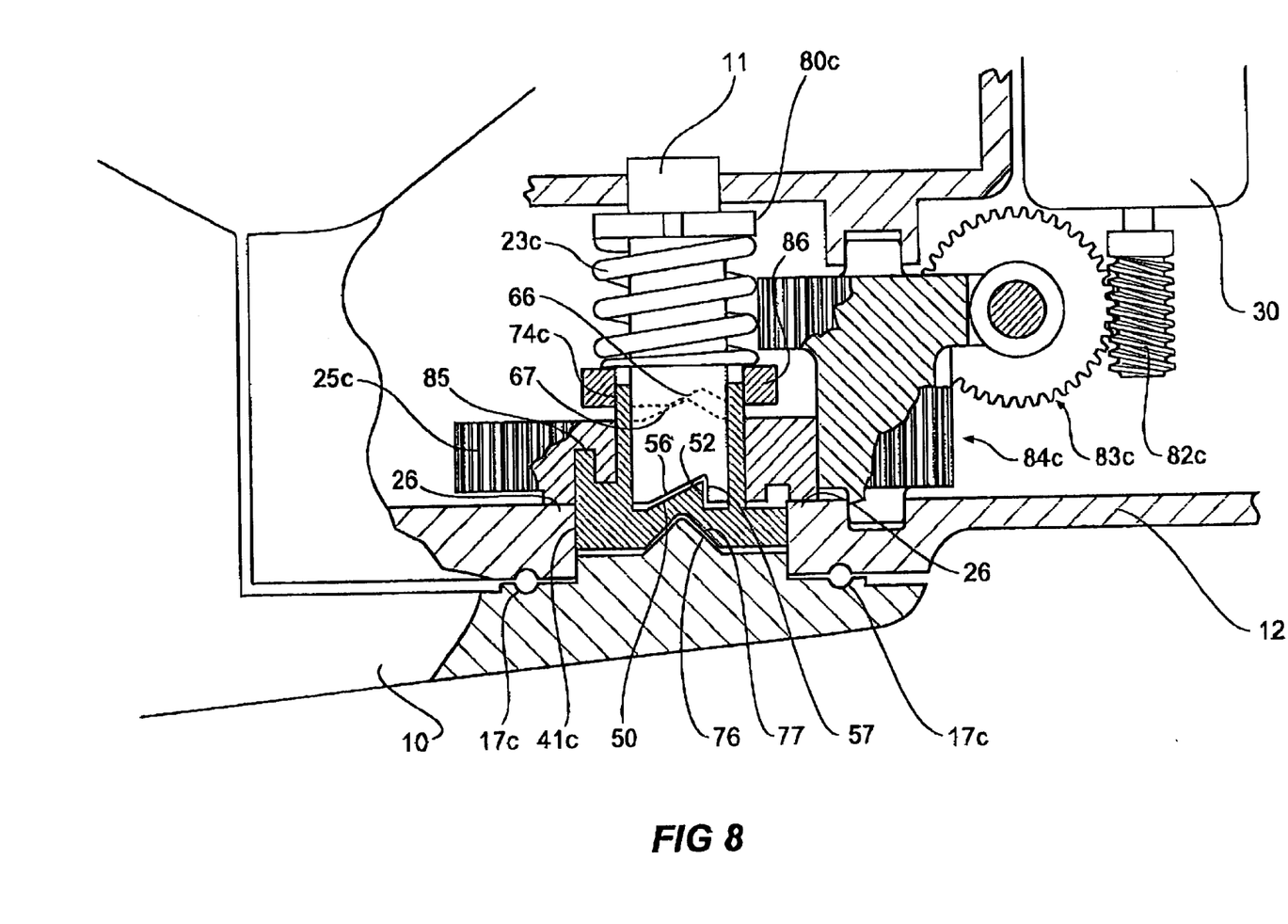
FIG. 8 shows a cross-sectional view of a fourth embodiment of the invention.

A fourth embodiment is shown in FIG. 8. This embodiment is a simpler assembly by comparison to the first three, but does have the disadvantage that when the clutch plate 41*c* is disengaged, no positive force will be applied to the detents 17*c*.

In this fourth embodiment, the clutch plate 41*c* is journalled to the external surface of the spigot 11. The gear wheel 25*c* is journalled to a tubular extension 74*c* of the clutch plate 41*c*. The spring 23*c* operates between the upper surface of the gear wheel 25*c* and a spring disc 80*c*. The spring disc 80*c* is secured to the spigot 11, and results in the compressed spring 23*c* applying a force to the upper surface of the gear wheel 25*c*. The gear wheel 25*c* in turn abuts against flange 26 which in turn applies load to the detent 17*c*. In this embodiment, the detents are balls held in corresponding recesses.

In this embodiment, the clutch plate 41*c* is held between the base of the gear wheel 25*c* and the base of the spigot 11. The actuator is provide between the abutting surfaces of the lower portion of the gear wheel 25*c* and the upper surface of the clutch plate 41*c*, and comprises first and second ramped surfaces 56 and 50. Vertical surfaces 57 and 51 are provided at the end of the ramped surfaces 56 and 50 to restrain rotation of the gear wheel 25*c* with respect to the clutch plate 41*c*. Posts 85 located within corresponding recesses within the gear wheel 25*c* and abut against surfaces within the gear wheel 25*c* to prevent its rotation in the other direction. This enables any force applied to the mirror head 12 to transfer via the gear wheel 25*c* to the clutch plate 41*c* which then enables the V-shaped projection and recesses 76 and 77 to disengage.

The gear drive in this fourth embodiment again differs from the previous embodiments in that the electric motor 30 drives a worm drive 82*c* which in turn drives a first reduction gear set 83*c* that itself drives a second reduction gear set 84*c*. The second reduction gear set 84*c* in turn drives the gear wheel 25*c*.

A helper disc 86 sits on top of the gear wheel 25*c*, and has third and fourth ramped surfaces 66 and 67 on the base of the helper disc 86 and the top of the gear wheel 25*c*. In addition, the tubular extension 74*c* has a castellated end which engages apertures within the helper disc 86 to prevent relative rotation between the two components but to enable the helper disc 86 to move with respect to the clutch plate 41*c*.

Figure 9:
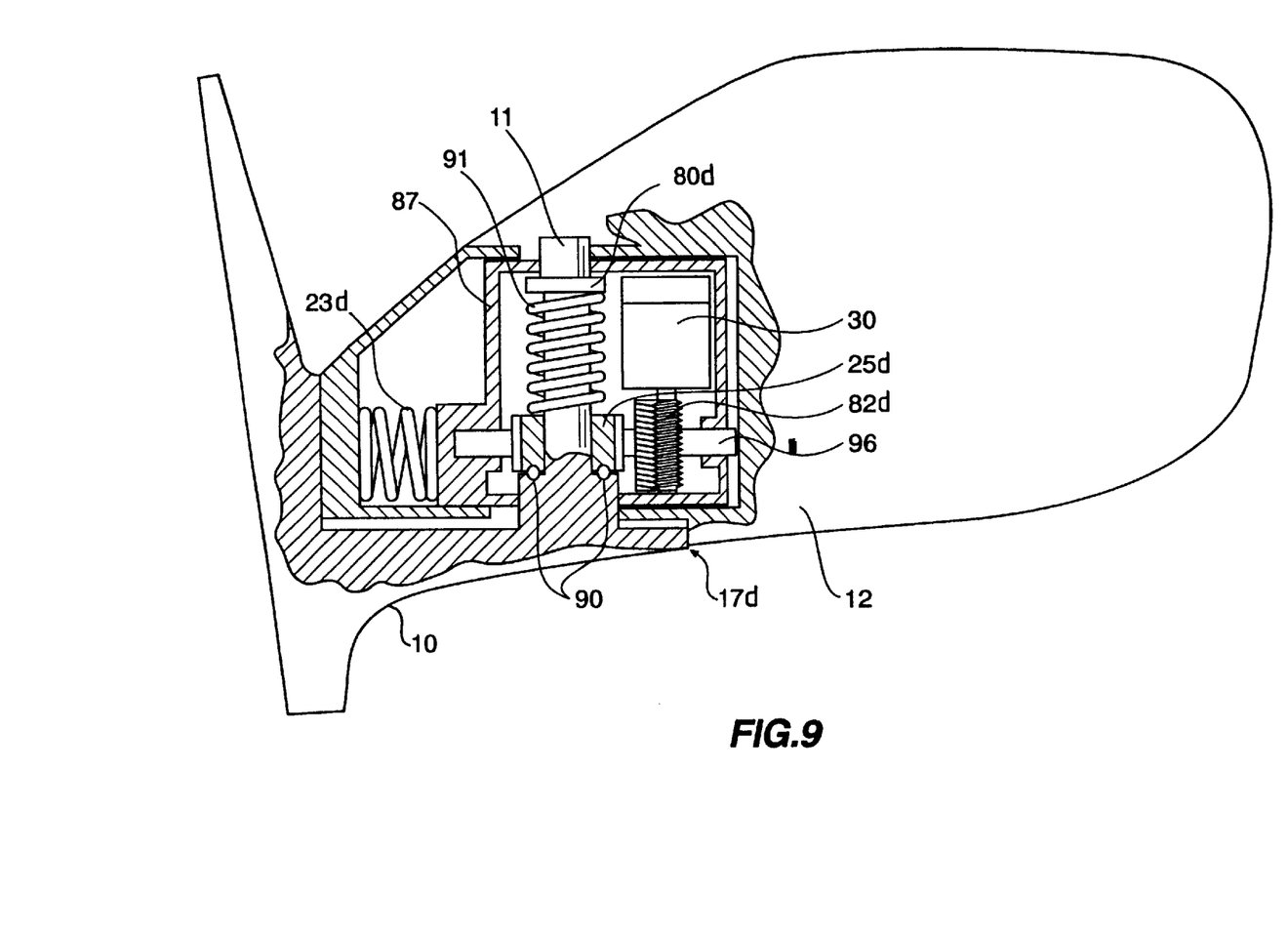
FIG. 9 shows a part cross-sectional side view of a fifth embodiment of the invention, FIG 10. shows a part plan cross-sectional view of a fifth embodiment according to the invention, and FIG. 11. shows the same part cross-sectional plan view shown in FIG. 10 but with detents partly disengaged.
Figure 10:
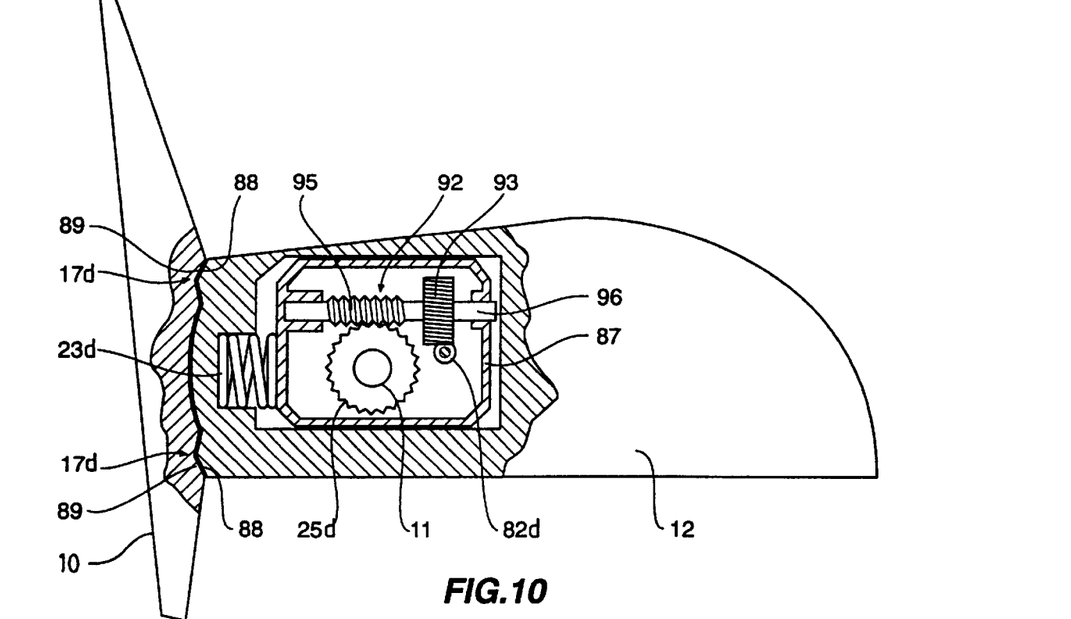
Figure 11:
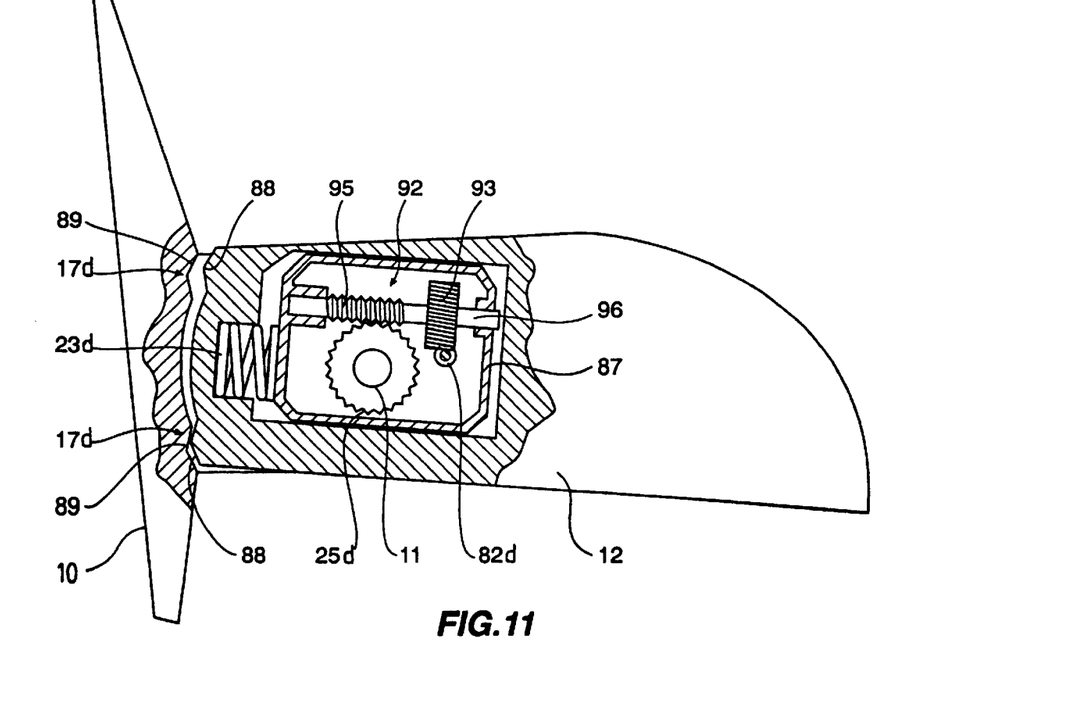

A fifth embodiment is illustrated in FIGS. 9 and 11. This embodiment differs from the first to fourth embodiments in that instead of the mirror head 12 moving vertically along the axis of the spigot 11, the mirror head 12 in this embodiment moves laterally with respect to the spigot 11. However, a similar operating principle applies in that the mirror head 12 is moved away from the detent 17*d*, to allow disengagement.

In this embodiment, a housing 87 is pivotally mounted to the spigot 11. The mirror head 12 is in turn mounted to the housing 87 so that it may slide with respect to the housing 87 to disengage or re-engage the detents 17*d*. A coil spring 23*d* is placed between the mirror head 12 and the housing 87 which acts to push the mirror head 12 in a direction that engages the detents 17*d*.

In this embodiment, the detents comprise substantially V-shaped projections 88 that locate within V-shaped recesses 89.

The gear wheel 25*d* is journalled to the spigot 11. A second spring 91 is held between the upper surface of the gear wheel 25*d* and a spring disc 80*d*. A breakaway clutch comprises detent balls 90 that are located at the base of the gear wheel 25*d*.

A shaft 92 is slidably journalled in the housing 87. The shaft 92 is able to rotate about its axis as well as being able to move longitudinally along its axis. The shaft 92 is driven by an electric motor 30 which drives a gear 93 via a worm drive 82*d*. The shaft 92 has a worm drive 95 that engages the gear wheel 25*d*.

Initial operation of the electric motor 30 will cause the worm drive 95 to push to shaft 92 along its longitudinal axis so that the end 96 of the shaft 92 pushes against the mirror head 12. The gear 93 is sufficiently wide enough to ensure that it remains engaged with the worm drive 82*d*. The shaft 92 is caused to move laterally due to the detents 17*d* being engaged and providing a resistive force to rotation of the worm drive 95 around the gear wheel 25*d*. Accordingly, the shaft 92 and associated worm drive 95 comprise an actuator which will move the mirror head 12 so as to compress the spring 23*d* and to disengage the detents 17*d*.

As with all the embodiments, the initial operation of the electric motor 30 will cause a combined movement where movement of the mirror head 12 will disengage the detent 17*d* which will result in some minor rotation of the mirror head 12 as the detent 17*d* progressively disengage. In other words, the drive means will cause rotation of the mirror head 12 to readjust for the changing positions of the detents 17*d*.

In the fifth embodiment, if the mirror head 12 is impacted or manually moved, then sufficient force will be applied to the clutch detents 90 to cause the gear wheel 25*d* to vertically lift against the spring 91. This will then enable the mirror head 12 to rotate freely with respect to the mirror mounting bracket 10.

What is claimed is:

1. An exterior rear view mirror comprising:
   a mirror mounting bracket,
   a spigot on said mounting bracket,
   a mirror head supported on said mounting bracket for rotation with respect to said spigot,
   at least one detent located between said mirror mounting bracket and said mirror head for holding said mirror mounting bracket and said mirror head in position, resilient means acting between said mirror mounting bracket and said mirror head, with respect to said detent, for holding said detent engaged thereby restraining movement of said mirror head, drive means operatively coupling said spigot to said mirror head for rotating said mirror head with respect to said spigot, and an actuator incorporated within said drive means which is moved by said drive means, relative to the spigot, upon initial operation of the drive means while said detent remains at least partially engaged and therefore initially resists rotation of said mirror head with respect to said mirror mounting bracket, the initial movement of said actuator applying a force to said resilient means which, in turn, compresses said resilient means and, once said resilient means is sufficiently compressed by movement of said actuator so that said detent becomes sufficiently disengaged to allow relative movement between said mirror head and said mirror mounting bracket, said actuator ceases movement, relative to the spigot, and further operation of said drive means, in turn, causes rotation of said mirror head with respect to said spigot.

2. An exterior rear view mirror according to claim 1 wherein said drive means includes:

a gear wheel mounted with respect to said spigot so its axis of rotation is coaxial with a longitudinal axis of said spigot, and drive gear engaging said gear wheel so that when said drive means is operated, and when said force applied to said detent is sufficiently relieved, said drive gear rotates around a periphery of said gear wheel to thereby rotate said mirror head.

3. An exterior rear view mirror according to claim 2 wherein said resilient means acts against said gear wheel and said gear wheel abuts against a portion of said mirror head to thereby transfer force to said detent.

4. An exterior rear view mirror according to claim 3 wherein said actuator comprises the combination of a first ramp surface on said gear wheel that engages a second ramp surface that is held with respect to said spigot so that, upon initial operation of said drive means, said ramp surfaces causes linear movement of said gear wheel with respect to the longitudinal axis of said spigot, as said gear wheel rotates, so as to relieve a holding force applied to said detent.

5. An exterior rear view mirror according to claim 4 further comprising a plurality of combined first and second ramped surfaces.

6. An exterior rear view mirror according to claim 5 wherein said gear wheel is journalled to said spigot with said resilient means acting between an upper end of said spigot and a base of said spigot.

7. An exterior rear view mirror according to claim 6 wherein said plurality of second ramp surfaces are located at a base of said spigot.

8. An exterior rear view mirror according to claim 7 further comprising:

a clutch plate located between a lower surface of said gear wheel and the base of said spigot, said plurality of second ramped surfaces located on an upper surface of said clutch plate, and a clutch detent between the lower surface of said clutch plate and said spigot that has sufficient holding force to restrain movement between said clutch plate and spigot when said drive means is operated but allows rotation of said mirror head when sufficient force is applied to said mirror head through the disengagement of said clutch detent.

9. An exterior rear view mirror according to claim 8 wherein said clutch detent comprises a plurality of projections on said mirror mounting bracket at the base of said spigot and a plurality of recesses in a base of said clutch plate in which said projections locate.

10. An exterior rear view mirror according to claim 9 further comprising a rotation limiter between said clutch plate and gear wheel that limits the amount of relative rotation between said clutch plate and said gear wheel.

11. An exterior rear view mirror according to claim 10 wherein said rotation limiter comprises a plurality of engaging vertical surfaces on both said clutch plate and gear wheel that abut to prevent relative rotation, said engaging vertical surfaces in one direction of rotation being spaced to allow for sufficient movement between said first and second ramped surfaces.

12. An exterior rear view mirror according to claim 11 wherein said second ramped surface further comprises a vertical edge adjacent its highest end that engages a corresponding vertical surface on said gear wheel that prevents relative rotation.

13. An exterior rear view mirror according to claim 12 wherein further vertical surfaces comprise posts on said clutch plate that extend into recesses in said gear wheel, said recesses having surfaces that engage said posts, said surfaces being sufficiently spaced from said posts to allow sufficient movement between said first and second ramped surfaces before said posts and recess surfaces engage and prevent relative rotation.

14. An exterior rear view mirror according to claim 6 further comprising:

a clutch plate located between an upper surface of said gear wheel and said resilient means that is restrained from rotation with respect to said spigot, and a clutch detent between the upper surface of said gear wheel and a lower surface of said clutch plate that has sufficient holding force to restrain movement between said clutch plate and said gear wheel when said drive means is operated but which allows rotation of said mirror head when sufficient force is applied to said mirror head through the disengagement of said clutch detent.

15. An exterior rear view mirror according to claim 14 wherein said clutch detent comprises a plurality of projections on said upper surface of said gear wheel and a plurality of recesses in said clutch plate in which said projections locate.

16. An exterior rear view mirror according to claim 6 further comprising:

a lifting plate located between a lower surface of said gear wheel and a base of said spigot and journalled to said spigot, said plurality of second ramped surfaces located on the upper surface of said lifting plate, a helper plate located above said gear wheel having a third ramped surface that engages with a corresponding fourth ramped surface on the top of said gear wheel, the direction of inclination of said third and fourth ramped surfaces being the same as said first and second ramped surfaces and the degree of inclination with respect to the horizontal of said third and fourth ramped surfaces being less than said first and second ramped surfaces, said helper plate being linked to said lifting plate so that they are not able to rotate independently, a clutch plate located between a lower surface of said clutch plate that has sufficient holding force to restrain movement between said clutch plate and combination of said lifting plate, gear wheel and helper plate when said drive means is operated but which allows rotation of said mirror head, when sufficient force is applied to said mirror head, by disengagement of said clutch detent.

17. An exterior rear view mirror according to claim 16 wherein said clutch detent comprises a plurality of projections on said upper surface of said helper plate and a plurality of recesses in said clutch plate in which said projections locate.

18. An exterior rear view mirror according to claim 4 wherein said spigot is tubular.

19. An exterior rear view mirror according to claim 18 wherein said gear wheel is located above an end of said spigot.

20. An exterior rear view mirror according to claim 19 wherein resilient means further comprises:
- a tube that locates within, and extends beyond, said spigot, said gear wheel journalled to said tube,
- a flange extending radially outwardly at a lower end of said tube,
- a lifting plate held within an upper end of said spigot so that said lifting plate can rotate with respect to said spigot, and a plurality of second ramped surfaces located on an upper surface of said lifting plate, and
- a compressed coil spring positioned around said tube and located between said flange and lifting plate, and a retainer on said tube that bears against said gear wheel and applies a downward force to said gear wheel.

21. An exterior rear view mirror according to claim 20 further comprising a rotation limiter between said lifting plate and said gear wheel that limits the amount of relative rotation between said lifting plate and said gear wheel.

22. An exterior rear view mirror according to claim 21 further comprising:
- a clutch plate located between the upper surface of said gear wheel and said retainer, that is held with respect to, but able to move along, said tube,
- means for preventing relative rotation between said clutch plate and said lifting plate, and
- a clutch detent between the upper surface of said clutch plate and the lower surface of said retainer that has sufficient holding force to restrain movement between said clutch plate and said retainer when said drive means is operated but which allows rotation of said mirror head, when sufficient force is applied to said mirror head, by disengagement of said clutch detent.

23. An exterior rear view mirror according to claim 22 wherein said clutch detent comprises a plurality of projections on said clutch plate and a corresponding plurality of recesses on said retainer in which said projections locate.

24. An exterior rear view mirror according to claim 23 wherein said clutch plate has third ramped surfaces and the upper surface of said gear wheel has fourth ramped surfaces that engage said third ramped surfaces, the direction of inclination of said third and fourth ramped surfaces being the same as said first and second ramped surfaces and the degree of inclination, with respect to the horizontal, of said third and fourth ramped surfaces being less than said first and second ramped surfaces.

25. An exterior rear view mirror according to claim 3 wherein said actuator comprises:
- a shaft slidably journalled with respect to said mirror head, and
- a worm drive on said shaft that engages said gear wheel so that upon initial operation of said drive means, the rotation of said worm moves said shaft along its longitudinal axis so that an end of said shaft moves said mirror head against said resilient means so that the force applied to said detent is relieved.

26. An exterior rear view mirror according to claim 25 further comprising a housing journalled to said spigot, that is slidably engaged by said mirror head, said resilient means comprising a coil spring located between said housing and said mirror head that acts to engage said detent, said shaft being slidably journalled in said housing so that upon operation of said drive means, said worm moves said shaft so that the end of said shaft pushes against said mirror head and compresses said spring so that the force acting on said detent is relieved.

27. An exterior rear view mirror according to claim 26 further comprising a clutch detent between said gear wheel and said spigot, and a spring acting between said gear wheel and said spigot to hold said clutch detent so that movement of said gear wheel with respect to said clutch detent is prevented when said drive means is operated but which allows rotation of said mirror head when sufficient force is applied to said mirror head by the disengagement of said clutch detent.

28. An exterior rear view mirror comprising:
- a mirror mounting bracket,
- a spigot on said mounting bracket,
- a mirror head supported on said mounting bracket for rotation with respect to said spigot,
- at least one detent located between said mirror mounting bracket and said mirror head for holding said mirror mounting bracket and said mirror head in position,
- resilient means acting between said mirror mounting bracket and said mirror head, with respect to said detent, for holding said detent engaged thereby restraining movement of said mirror head,
- drive means operatively coupling said spigot to said mirror head for rotating said mirror head with respect to said spigot,
- an actuator incorporated within said drive means which is moved by said drive means, relative to the spigot, upon initial operation of the drive means while said detent remains at least partially engaged and therefore initially resists rotation of said mirror head with respect to said mirror mounting bracket, the initial movement of said actuator applying a force to said resilient means which, in turn, compresses said resilient means and, once said resilient means is sufficiently compressed by movement of said actuator so that said detent becomes sufficiently disengaged to allow relative movement of said mirror head and said mirror mounting bracket, said actuator ceases movement, relative to the spigot, and said drive means, in turn, causes rotation of said mirror head with respect to said spigot,
- a gear wheel mounted with respect to said spigot, and
- said resilient means further comprises:
  - a tube that locates within, and extends beyond, said spigot, said gear wheel is journalled to said tube,
  - a flange extending radially outwardly at a lower end of said tube,
  - a spigot ledge extending radially inwardly at an upper end of said spigot,
  - a compressed coil spring positioned around said tube and located between said flange and said ledge, and
  - a retainer on the lower end of said tube that bears against said gear wheel and applies a downward force to said gear wheel.

29. An exterior rear view mirror according to claim 28 wherein:
said gear wheel has an upper surface and a lower surface,
said actuator comprises a first ramp surface on said gear wheel that engages with a second ramp surface held with respect to said spigot so that, upon initial operation of said drive means, said ramp surfaces causes linear movement of said gear wheel with respect to a longitudinal axis of said spigot, as said gear wheel rotates, so as to relieve a holding force applied to said detent, and
a lifting plate located below the lower surface of said gear wheel and journalled to said tube and held with respect to said spigot, said second ramped surface located on an upper surface of said lifting plate.

30. An exterior rear view mirror according to claim 29 further comprising a rotation limiter between said lifting plate and said gear wheel that limits the amount of relative rotation between said lifting plate and said gear wheel.

31. An exterior rear view mirror according to claim 30 wherein said rotation limiter comprises a plurality of engaging vertical surfaces on both said lifting plate and gear wheel that abut to prevent relative rotation, said engaging vertical surfaces in a first direction of rotation being spaced to allow for sufficient movement between said first and second ramped surfaces.

32. An exterior rear view mirror according to claim 31 wherein said lifting plate comprises a plurality of second ramped surfaces, each of said plurality of second ramped surfaces has a first vertical surface positioned at an upper end thereof and extending vertically therefrom; and
said gear wheel has corresponding first vertical surfaces which are normally spaced from said vertical surfaces of said plurality of second ramped surfaces so that relative movement occurs between said first and second ramped surfaces before said first vertical surfaces of said gear wheel engage with said first vertical surfaces of said lifting plate.

33. An exterior view mirror according to claim 32 wherein:
said lifting plate has a plurality of second vertical surfaces, each of the plurality of second vertical surfaces of the lifting plate is adjacent one of said plurality of second ramped surfaces of said lifting plate;
said gear wheel has corresponding second vertical surfaces, each of said corresponding second vertical surfaces of said gear wheel abut with one of the plurality of second vertical surfaces of the lifting plate and prevent rotation in a second direction that is opposite to a first direction of rotation.

34. An exterior rear view mirror according to claim 29 further comprising:
a clutch plate located between said spigot ledge and the end of said coil spring that is held with respect to, but able to move along, said tube and restrained from rotating with respect to said lifting plate, and
a clutch detent between an upper surface of said clutch plate and a lower surface of said ledge that has sufficient holding force to restrain movement between said clutch plate and said spigot when said drive means is operated but which allows rotation of said mirror head, when sufficient force is applied to said mirror head, by disengagement of said clutch detent.

35. An exterior rear view mirror according to claim 34 wherein said clutch detent comprises a plurality of projections on said spigot ledge and a corresponding plurality of recesses on said clutch plate in which said projections locate.

36. An exterior rear view mirror according to claim 35 wherein said spigot ledge comprises a plurality of ledge segments spaced around an interior surface of said spigot and each of said ledge segments supports a projection which engages with one of said recesses of said clutch plate.

37. An exterior rear view mirror according to claim 34 wherein said tube has a plurality of longitudinal channels, and said clutch plate has a plurality of lugs that engage said channels, that prevent rotation of said clutch plate with respect to said tube but allow movement of said clutch plate therealong.

38. An exterior rear view mirror according to claim 34 wherein said clutch plate has a plurality of posts and said lifting plate has a plurality of recesses within which posts locate to prevent relative rotation therebetween but which allow separation of said clutch plate with respect to said lifting plate.

39. An exterior rear view mirror according to claim 28 wherein said retainer has third ramped surfaces and the upper surface of said gear wheel has fourth ramped surfaces that engage said third ramped surfaces, the direction of inclination of said third and fourth ramped surfaces being the same as said first and second ramped surfaces and the degree of inclination, with respect to the horizontal of said third and fourth ramped surfaces, being less than said first and second ramped surfaces, said retainer restrained from rotation with respect to said tube.

40. An exterior rear view mirror comprising:
a mirror mounting bracket;
a spigot on said mounting bracket;
a mirror head supported on said mounting bracket for rotation with respect to said spigot;
at least one detent located between said mirror mounting bracket and said mirror head for holding said mirror mounting bracket and said mirror head in position;
resilient means acting between said mirror mounting bracket and said mirror head, with respect to said detent, for holding said detent engaged thereby restraining movement of said mirror head;
drive means operatively coupling said spigot to said mirror head for rotating said mirror head with respect to said spigot;
an over ride clutch to facilitate manual movement of the mirror head relative to the mirror mounting bracket and prevent jamming of the mirror head during operation of said drive means; and
an actuator incorporated within said drive means is moved by said drive means, relative to the spigot, upon initial operation of the drive means while said detent remains at least partially engaged and therefore initially resists rotation of said mirror head with respect to said mirror mounting bracket, the initial movement of said actuator applying a force to said resilient means which, in turn, compresses said resilient means and, once said resilient means is sufficiently compressed by movement of said actuator so that said detent becomes sufficiently disengaged to allow relative movement between said mirror head and said mirror mounting bracket, said actuator ceases movement, relative to the spigot, and further operation of said drive means, in turn, causes rotation of said mirror head with respect to said spigot.

* * * * *